United States Patent [19]

Kurachi et al.

[11] Patent Number: 4,835,682
[45] Date of Patent: May 30, 1989

[54] COMPUTER SYSTEM FOR PREVENTING COPYING OF PROGRAM FROM A STORAGE MEDIUM BY MODIFYING THE PROGRAM USING A UNIQUE KEY

[75] Inventors: Tadashi Kurachi; Shoji Ueda, both of Tokyo, Japan

[73] Assignee: Tokyo Shibaura Denki Kabushiki Kaisha, Kawasaki, Japan

[21] Appl. No.: 873,064

[22] Filed: Jun. 4, 1986

Related U.S. Application Data

[63] Continuation of Ser. No. 535,628, Sep. 26, 1983, abandoned.

[30] Foreign Application Priority Data

Sep. 30, 1982 [JP] Japan ................................ 57-171816

[51] Int. Cl.⁴ .............................................. G06F 5/00
[52] U.S. Cl. ........................................ 364/200; 380/4; 360/15
[58] Field of Search .................. 380/3, 4; 360/15, 48; 364/200 MS File, 900 MS File

[56] References Cited

U.S. PATENT DOCUMENTS 4,157,454 6/1979 Becker .

FOREIGN PATENT DOCUMENTS

WO8102351 8/1981 PCT Int'l Appl. .

OTHER PUBLICATIONS

Gurugé A., "Preventing Unauthorized Access to Diskette-Loaded Microcode," IBM Technical Disclosure Bulletin, vol. 21, No. 2, Jul. 1978, pp. 836-837.
American Federation of Information Processing Soc. U.S.A.-Japan Compt. Conference Proceedings Tokyo, Aug. 26-28, 1975.
IBM—vol. 14, No. 11, Apr. 1972, "Computer Program Protection".

Primary Examiner—David L. Clark
Attorney, Agent, or Firm—Cushman, Darby & Cushman

[57] ABSTRACT

A computer system for preventing copying or duplication of a program which has a CPU, a ROM, a RAM, an FDD unit, a loader program executed by the CPU for loading the program from the FDD unit to the memory, an address selector switch, and an FM/MFM modulating circuit. The CPU reads the program from the FDD unit to the RAM under the control of a control program stored in the ROM, the program being stored in the FDD unit in the MFM mode which does not allow readout of the program by the loader program. The readout program is modified by the FM/MFM modulating circuit in accordance with a machine number unique to the machine and read from the address selector switch. The modified program is written in the FDD unit by the FM/MFM modulating circuit.

6 Claims, 5 Drawing Sheets

| HEAD / TRACK | TOP SURFACE (0) | BOTTOM SURFACE (1) |
|---|---|---|
| 0 | FM | MFM |
| 1 TO LAST | MFM ||

| HEAD / TRACK | TOP SURFACE (0) | BOTTOM SURFACE (1) |
|---|---|---|
| 0 | MFM ||
| 1 TO LAST | ||

COMPUTER SYSTEM FOR PREVENTING COPYING OF PROGRAM FROM A STORAGE MEDIUM BY MODIFYING THE PROGRAM USING A UNIQUE KEY

This is a continuation of application Ser. No. 535,628, filed Sept. 26, 1983, which was abandoned upon the filing hereof.

BACKGROUND OF THE INVENTION

The present invention relates to a computer system for preventing duplication or copying of a program.

A program (either an operating system program or a utility program) to be executed by an office computer or a personal computer is generally stored in a storage medium such as a floppy disc or a cassette tape. If such a program stored in a storage medium is copied, this program can be executed with another machine of the same type. However, if a program can be copied easily, this infringes upon the rights of a person who develops and sells a general-purpose program. Therefore a demand exists for a copy-prevention method.

In view of this, a method has been proposed for modifying a program according to a machine number unique to each machine, so that a particular machine alone can execute the program. However, this method is disadvantageous in that a program supplier must modify each software medium accompanying each machine. Furthermore, when a software item is general purpose, the type of machine used to execute the software item is not specified. For these reasons, the above method is impractical.

SUMMARY OF THE INVENTION

It is an object of the present invention to provide a computer system for preventing duplication of a program, which eliminates the disadvantage of the prior art and wherein a user himself performs modification of the program.

According to the present invention, a supplier of a program stores in a storage medium a program in a storage mode which does not allow readout by a program load program that is a standard program of the information processing equipment of the user. The user who has purchased a program cannot directly read out the program from the storage medium for execution thereof, due to the different storage mode. Thus, each machine has a means for reading out the program from the storage medium which is stored therein in the special storage mode and a means for converting the special storage mode of the readout program to the standard storage mode and then writing the program into the storage medium. When the user wishes to execute the program, these two means are initialized so as to convert the program to the standard storage mode and rewrite the program in the storage medium. As the program is rewritten in the storage medium in this manner, the machine modifies the program in accordance with a number (to be referred to as a machine number) unique to this machine. Since a program which is modified in a manner unique to each machine is written in this machine, after this modification is performed, the contents of the storage medium cannot be executed by another machine even if these contents are copied.

BRIEF DESCRIPTION OF THE DRAWINGS

Other objects and features of the present invention will be apparent from the following description of the accompanying drawings in which.

DETAILED DESCRIPTION OF THE PREFERRED EMBODIMENT

Figure 1:
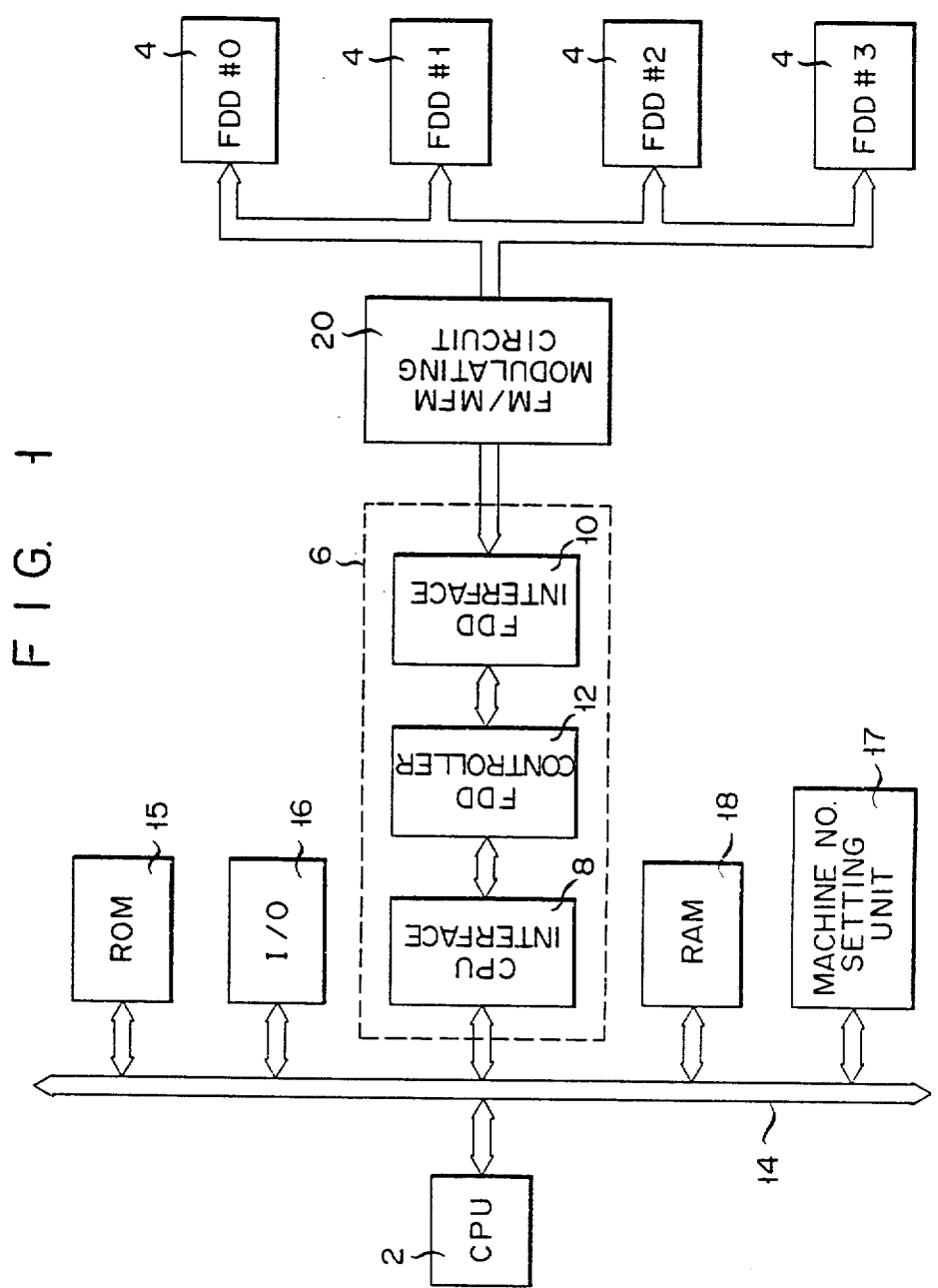
FIG. 1 is a block diagram of a computer system according to an embodiment of the present invention.

FIG. 1 is a block diagram showing an embodiment of the present invention. A special modulation mode is adopted which does not allow readout of the program by a program for performing a general program loading. A central processing unit (to be referred to as a CPU) 2 is connected to a floppy disc controller (to be referred to as an FD controller) 6 through a system bus 14 as well as to an I/O 16, a random access memory (to be referred to as a RAM) 18, a read only memory (to be referred to as a ROM) 15 and a machine no. setting unit 17 through the system bus 14. The FD controller 6 is connected to a floppy disc drive (to be referred to as an FDD) 4 through an FM (Frequency Modulation)/MFM (Modified FM) modulating circuit 20. The CPU 2 may be a 16-bit microcomputer i-8088 from Intel, U.S.A. The FD controller 6 consists of a CPU interface 8, an FDD controller 12, and an FDD interface 10. The FD controller 6 may be a model 8271 from Intel, U.S.A. The FDD 4 may be a double-sided double density model FDD ND-20D from Toshiba Corporation, Japan.

The recording/modulating mode of a double-sided double density floppy disc of a system with the configuration as described above generally consists of the FM mode for 0 head (top surface) and track 0, the MFM mode for 1 head (bottom surface) and track 0, and the MFM mode for track 1 to the innermost track of each surface.

Figures 2, 3, 5:
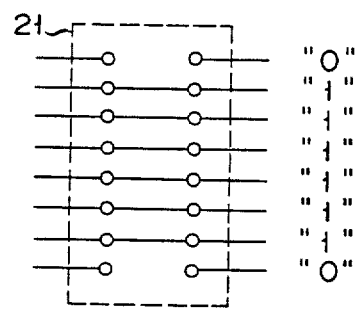
FIG. 2 shows a conventional, standard modulation mode of data stored in a floppy disc.
FIG. 3 shows a special or non-standard modulation mode used according to the system of the present invention.
FIG. 5 is a view showing an address selector switch for setting a machine number.

According to one feature of the embodiment, the supplier stores a program in a floppy disc in a special modulation mode which is different from a standard modulation mode of the machine. The supplier then supplies the program to the user. In this embodiment, since the modulation mode as shown in FIG. 2 is adopted as a standard modulation mode, a modulation mode as shown in FIG. 3 is adopted as a non-standard modulation mode. According to the modulation mode shown in FIG. 3, information is written in all the tracks of the floppy disc in the MFM mode. In the standard modulation mode, data is stored in the 0 track on the top surface of the disc in the FM mode. Thus, when the program is read out in the standard modulation mode from a medium in which the program is stored in the non-standard modulation mode, a readout error is generated.

The non-standard modulation mode is adopted in this embodiment for the following reason. According to this embodiment, the system has an FM/MFM modulating circuit. For this reason, the modulation/demodulation modes can be freely set by setting parameters in this circuit, so that a special circuit need not be added to the system expressly for this purpose. In general, the mode of the FM/MFM modulating circuit 20 can be set by a mode setting signal from the FDD controller 12.

A program stored in a floppy disc in the mode as shown in FIG. 3 cannot be read out by a program load program (initial program loader, a program initialized by a load command, etc.) for reading a floppy disc stored in the standard mode as shown in FIG. 2. The standard modulation program supplies a command to the FDD controller 12 so as to read the 0 track on the top surface in the FM demodulation mode. However, since data is stored in the MFM mode in the 0 track of the top surface of the supplied medium, an FDD error is generated, and the program cannot be read out.

Thus, in this embodiment, the user must first convert the program to a mode which allows execution of the program, that is, the user must rewrite the program in the floppy disc in the standard modulation mode as shown in FIG. 2. As the program is rewritten in the floppy disc, the program itself is modified by a machine number (ID) unique to the machine.

How the user converts the program from the special modulation mode (MFM mode) to the standard modulation mode (FM mode) will now be described.

Figure 4:
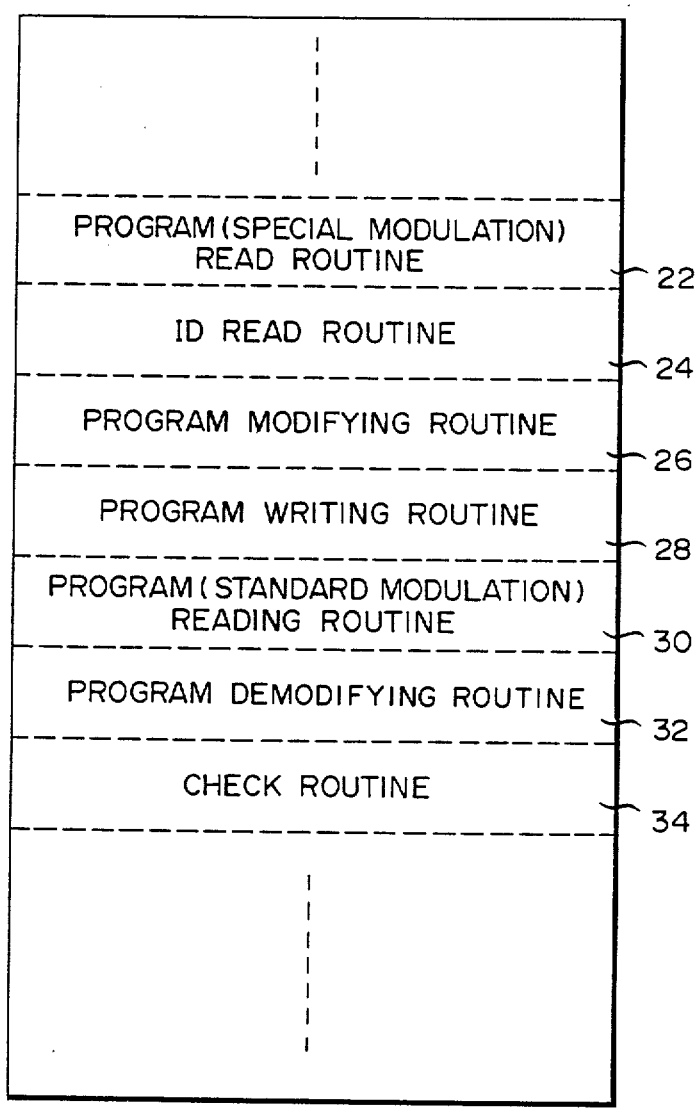
FIG. 4 shows a memory map of various routines for preventing duplication of a program according to the system of the present invention.

FIG. 4 shows a memory map of the RAM 18 shown in FIG. 1. The RAM 18 stores routines 22 to 34. Routine 22 is for reading a program recorded in a floppy disc in the special modulation mode (MFM mode). Routine 24 is for reading out the machine number (ID) set in the machine in a hardware manner. Routine 26 is for modifying the program in accordance with the read-out machine number ID. Routine 28 is for writing the modified program in the floppy disc again. Routine 30 is for reading the program in the floppy disc in the standard modulation mode (FM mode). Routine 32 is for de-modifying the read program. Routine 34 is for determining if the de-modified program in routine 32 can be executed by the machine. An address selector switch 21 of DIP type is used in this embodiment as a means for setting the machine number ID of the machine.

Figure 6:
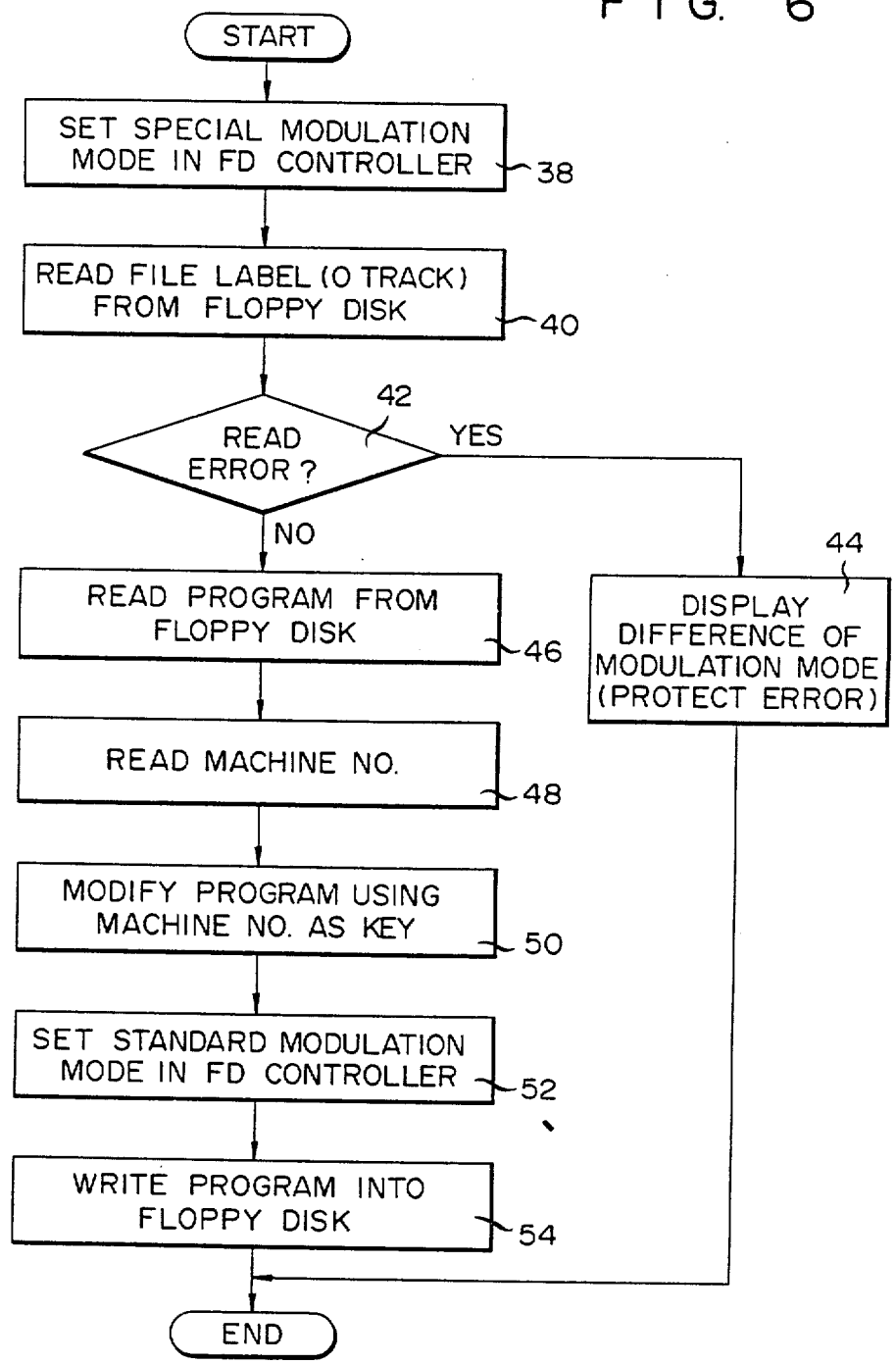
FIG. 6 is a flowchart for controlling execution of a CUSTOMERIZE command.

In the example shown in FIG. 5, the ID is a binary number "01111110", which is 126 in decimal notation. Note that such an ID code may be stored as a constant in the ROM 15. In this embodiment, a CUSTOMERIZE command is supplied to the user. When this command is keyed in from the keyboard, the steps shown in FIG. 6 are started.

In step 38, the FD controller 6 is set in the special modulation mode to demodulate and read 0 head and 0 track in the MFM mode by the program read routine 22. In step 40, the file label (0 track) is read from the floppy disc. In step 42, it is checked to determine if there is any read error. If the result is YES in step, 42, the difference in modulation mode is displayed. If the result is NO in step 42, the program is read from the next track in step 46. In step 48, the machine number ID is read by the ID read routine 24. In step 50, the program is modified in accordance with the machine number ID by the program modifying routine 26. Part or all of the program may be modified. In step 52, the standard modulation mode (FM modulation of 0 head and 0 track) is set in the FD controller 6 by the program writing routine 28. In step 54, the program is written in the floppy disc.

Figure 7:
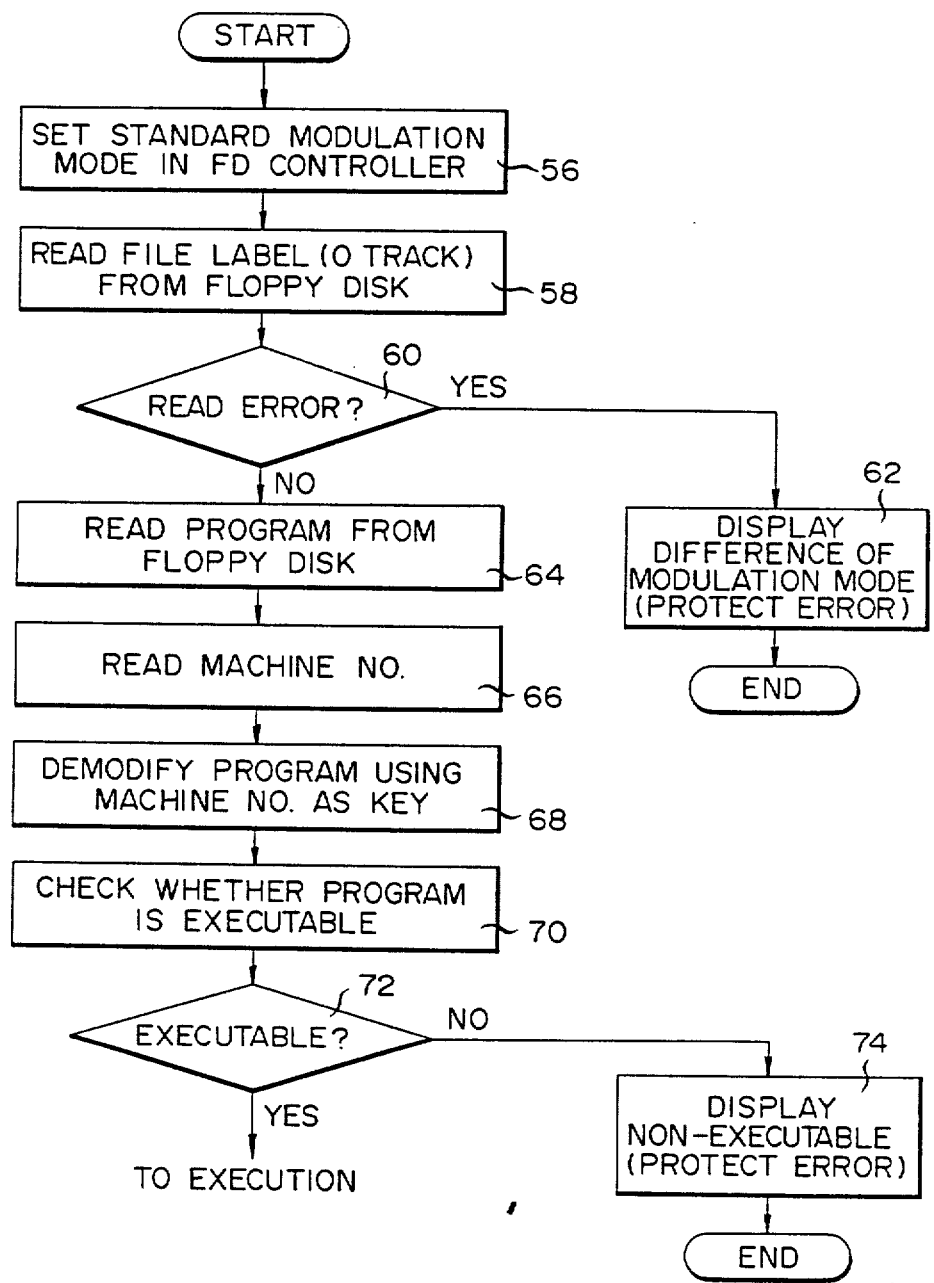
FIG. 7 is a flowchart for controlling loading of the program converted from the special modulation mode to the standard modulation mode from a floppy disc to a memory.

When the program converted from the special modulation mode to the standard modulation mode is read out from the floppy disc, the standard modulation mode is set in the FD controller 6 by the program (standard modulation) reading routine 30 in step 56 in FIG. 7. In step 58, the file label (0 track) is read from the floppy disc. If there is a read error (YES) in step 60, the difference in the modulation mode is displayed in step 62. If NO in step 60, the program is read from the floppy disc in step 64. In step 66, the machine number ID is read by the ID read routine 24. In step 68, the program is de-modified in accordance with the machine number ID by the program de-modifying routine 32. Step 70 check whether the program can be executed by the check routine 34. If NO in step 72., step 74 informs the user that the program cannot be executed.

In the embodiment described above, the special storage mode is a modulation mode different from the standard modulation mode. However, the format of the information written in the floppy disc itself can be changed. Also, conversion from the special storage mode to the standard storage mode is performed in response to a CUSTOMERIZE command. However, conversion may be automatically effected by checking the storage medium inserted in an external memory device. Even if another user copies the contents of a program from a floppy disc which are recorded in the standard storage mode according to the method of the present invention, de-modification and execution of the program cannot be performed on another machine.

A floppy disc storing a program supplied by a manufacturer and recorded in the non-standard storage mode thus does not allow copying of the contents.

What is claimed is:

1. A computer system having a central processing unit, an internal memory and an external storage including a storage medium, said computer system comprising:

means for determining if a program on said storage medium has been accessed a first time;

first accessing means, coupled to said determining means, for reading a program from storage medium into said internal memory when said determining means determines that said program is being accessed for the first time, said first accessing means including program supplier means for reading information from said storage medium that is in a special storage format;

first means for storing a unique key set of said computer system;

program modifying means, coupled to said internal memory and to said first means, for modifying the program read from said storage medium by said first accessing means and stored in said internal memory based on said unique key set, said program modifying means including means for determining when said first accessing means has operated, and means for activating said program modifying means once an operation of said first accessing means has been detected by said determining means;

program writing means, coupled to said internal memory, for writing the program modified by said program modifying means in the storage medium in a standard storage format; and standard program loading means for reading said program from said storage medium of said external storage in said standard format after said determining means determines that said storage medium storing the program have been first accessed, said standard program loading means reading said program in said standard storage format and being incapable of reading said program in said special storage format.

2. A computer system according to claim 1, wherein said special storage format comprises a different data format from said standard data format and is different from a usual format used by said external storage for writing data forming the program in the storage medium.

3. A computer system according to claim 1, further comprising a plurality of switches for setting said unique key.

4. A computer system according to claim 1, wherein said first means for storing said unique key is a read-only memory.

5. A computer system according to claim 1, further comprising program demodifying means for demodifying said modified program by said key which is loaded by said standard program load means from said storage medium and stored in the internal memory when the program is executed by said central processing unit.

6. A computer according to claim 1, wherein said first accessing means is activated by a command executed by said central processing unit.

* * * * *